(No Model.)
P. H. WILLIAMS.
SECTIONAL WHEEL.
No. 531,820. Patented Jan. 1, 1895.
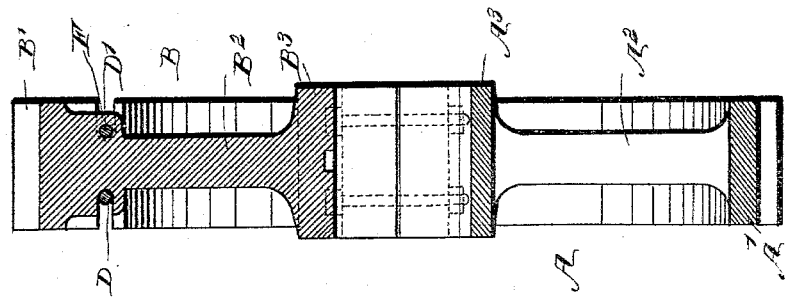
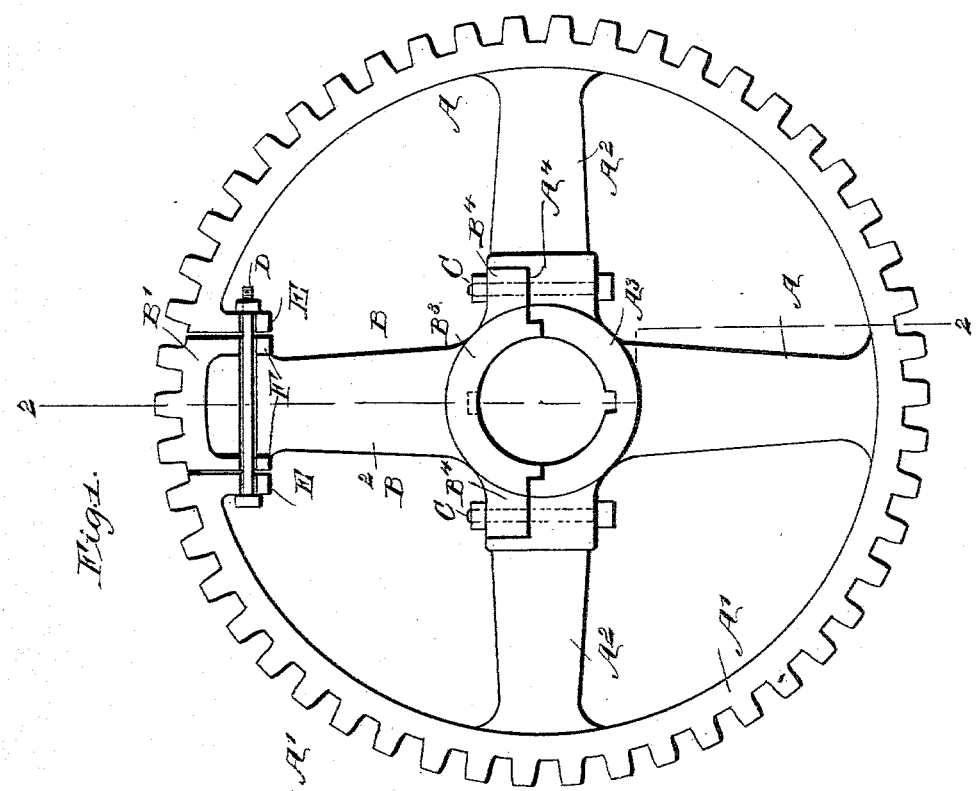
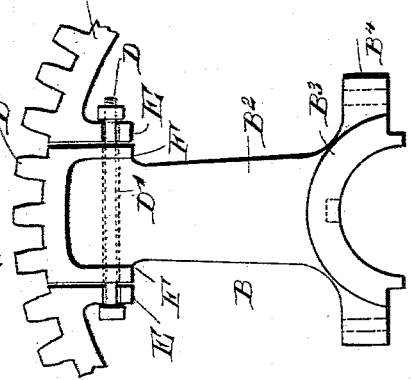
WITNESSES:
J. F. McArdle
C. Sedgwick
INVENTOR
P. H. Williams
BY
Munn & Co.
ATTORNEYS.

UNITED STATES PATENT OFFICE.

PERRY HAZZARD WILLIAMS, OF MEMPHIS, TENNESSEE, ASSIGNOR OF TWO-THIRDS TO SAMUEL J. WEAVER AND DAVID R. WILLIAMS, OF ST. LOUIS, MISSOURI.

SECTIONAL WHEEL.

SPECIFICATION forming part of Letters Patent No. 531,820, dated January 1, 1895.

Application filed February 15, 1894. Serial No. 500,192. (No model.)

*To all whom it may concern:*

Be it known that I, PERRY HAZZARD WILLIAMS, of Memphis, in the county of Shelby and State of Tennessee, have invented a new and Improved Sectional Wheel, of which the following is a full, clear, and exact description.

The object of the invention is to provide a new and improved sectional wheel, which is simple and durable in construction, and arranged for attaching it to a shaft without removing the latter from its bearings.

The invention consists of certain parts and details, and combinations of the same, as will be fully described hereinafter and then pointed out in the claims.

Reference is to be had to the accompanying drawings, forming a part of this specification, in which similar letters of reference indicate corresponding parts in all the figures.

Figure 1 is a face view of the improvement arranged as a gear wheel. Fig. 2 is a transverse section of the same on the line 2—2 of Fig. 1; and Fig. 3 is a rear face view of part of the improvement.

The improved wheel is made in two principal sections A and B, of which the section A is provided with the rim $A'$, the spokes $A^2$, and the partial hub $A^3$, as is plainly shown in Fig. 1. The section B is provided with the rim part $B'$, forming with the rim $A'$ the complete rim of the wheel, and the said rim part $B'$ is formed on a spoke $B^2$, carrying a sectional hub $B^3$ provided with flanges $B^4$, fitted into corresponding seats $A^4$ formed on the sides of the partial hub $A^3$, as is plainly shown in Fig. 1. The flanges $B^4$ are held in position on the seats $A^4$ by bolts C.

The rim part $B'$ is only of such length as to permit of passing the shaft for the wheel hub through the opening formed in the rim $A'$ at the time the section B is removed. In order to hold the outer part of the section B in place on the section A, I provide two bolts D and $D'$ held in lugs E depending from the ends of the rim sections $A'$, as is plainly shown in Figs. 1 and 3. The bolts D and $D'$ engage the section B so as to securely fasten the outer part of the latter in place to complete the entire wheel.

As shown in Fig. 2, the bolt $D'$ passes through an aperture in the flange F of the spoke $B^2$ and engages the slots in the lugs E of the rim section $A'$ while the other bolt D engages slots in both the flange F and lugs E. The bolt D is put in place after the section B has been fastened in position on the partial hub $A^3$, as previously described. Now, it will be seen that when the section B is removed from the section A the latter can be readily placed in position on a shaft, without removing the shaft from its bearings, by placing the section A in position on the shaft, the latter passing through the space between the ends of the rim section $A'$ to thus engage the sectional hub $A^3$. The section B is then placed in position and bolted at its flanges $B^4$ to the seats $A^4$, after which the bolts D and $D'$ are fastened in place in the lugs E and flanges F, to securely hold the section B in position on the section A at its inner as well as at its outer end.

Having thus fully described my invention, I claim as new and desire to secure by Letters Patent—

1. A sectional wheel, consisting of the section A formed with the broken rim $A'$ having the depending lugs E, spokes $A^2$, and the partial hub $A^3$, having seats $A^4$, the section B formed with the rim part $B'$, the spoke $B^2$ and sectional hub $B^3$ provided with flanges $B^4$, and bolts for securing the hub sections together and the outer part of the spoke $B^2$ between the lugs of the section A, substantially as shown and described.

2. In a sectional wheel, the combination with the section A having a broken rim and a sectional hub, and provided with slotted lugs depending from the ends of the rim, of the section B, comprising the rim section $B'$, the spoke B having flanges F, and the hub section $B^3$ having the flanges $B^4$, the bolts C securing the said flanges to the hub of the section A, and the bolts D $D'$, engaging the lugs and flanges, substantially as herein shown and described.

PERRY HAZZARD WILLIAMS.

Witnesses:
JNO. T. HUDSON,
JAMES J. BURKE.